(12) United States Patent
Everett

(10) Patent No.: US 6,641,203 B1
(45) Date of Patent: Nov. 4, 2003

(54) WINDPROOF AND THEFTPROOF VEHICLE COVER

(76) Inventor: Ross W. Everett, 1815 Watercrest Cir., Lawrenceville, GA (US) 30043

(*) Notice: Subject to any disclaimer, the term of this patent is extended or adjusted under 35 U.S.C. 154(b) by 0 days.

(21) Appl. No.: 10/207,639

(22) Filed: Jul. 29, 2002

(51) Int. Cl.[7] .................................................. B60J 11/00
(52) U.S. Cl. .............................. 296/136.11; 296/95.1; 150/166
(58) Field of Search ........................ 296/136, 95.1, 296/136.01, 136.07, 136.1, 136.11; 160/370.21; 150/166

(56) References Cited

U.S. PATENT DOCUMENTS

| | | | | |
|---|---|---|---|---|
| 2,666,840 A | * | 1/1954 | Poirier | 219/528 |
| 4,222,032 A | * | 9/1980 | Speer | 340/426 |
| 4,274,077 A | * | 6/1981 | Feiger | 340/426 |
| 4,432,581 A | * | 2/1984 | Guma | 296/136 |
| 4,720,135 A | * | 1/1988 | Farina | 296/136 |
| 4,727,898 A | * | 3/1988 | Guma | 135/87 |
| 4,784,215 A | * | 11/1988 | Sing | 165/41 |
| 4,842,324 A | * | 6/1989 | Carden | 296/136 |
| 4,850,635 A | * | 7/1989 | Lindell | 296/136 |
| 4,903,749 A | | 2/1990 | Hanania | |
| 4,948,191 A | * | 8/1990 | Cao | 296/95.1 |
| 4,958,881 A | * | 9/1990 | Piros | 296/98 |
| 4,972,892 A | * | 11/1990 | Yeh | 150/166 |
| 5,022,700 A | * | 6/1991 | Fasiska et al. | 296/98 |
| 5,088,788 A | * | 2/1992 | Moulton | 296/136 |
| 5,176,421 A | * | 1/1993 | Fasiska | 296/136 |
| 5,435,362 A | | 7/1995 | Chiang | |
| 5,456,515 A | | 10/1995 | Dang | |
| 5,597,196 A | * | 1/1997 | Gibbs | 296/98 |
| 5,597,197 A | * | 1/1997 | Mowar et al. | 296/136 |
| 5,791,361 A | * | 8/1998 | Chong | 135/88.01 |
| 5,941,593 A | | 8/1999 | McCann | |
| 6,017,078 A | * | 1/2000 | Stagner | 296/136 |
| 6,092,857 A | * | 7/2000 | Rivas | 296/136 |
| 6,318,426 B1 | * | 11/2001 | Thomas | 150/166 |
| 6,322,129 B2 | | 11/2001 | Huotari | |
| 2001/0045758 A1 | * | 11/2001 | Vieira-Soares | 296/98 |

* cited by examiner

*Primary Examiner*—Joseph D. Pape
*Assistant Examiner*—Patricia L. Engle
(74) *Attorney, Agent, or Firm*—Fulbright & Jaworski L.L.P.

(57) ABSTRACT

Systems and methods which provide a cover having a retaining piping disposed along an edge thereof to tether the cover to a vehicle or other object. Retaining piping is preferably disposed. such that a portion of the cover passes through an opening in the vehicle and the retaining piping cannot pass through the opening, thereby preventing the removal of the cover from the vehicle.

56 Claims, 2 Drawing Sheets

WINDPROOF AND THEFTPROOF VEHICLE COVER

TECHNICAL FIELD

The invention relates generally to providing protective covering of vehicles and, more specifically, to vehicle covers adapted to be conveniently retained.

BACKGROUND OF THE INVENTION

It has long been important to provide protection of a vehicle, such as a car, truck, sport utility vehicle, or other passenger vehicle, for both safety and maintenance reasons. For example, when a vehicle is parked out of doors in cold temperatures and exposed to relatively moist air, such as in the spring or fall, the cold surfaces of the vehicle may cause condensation of the moisture from the air. Such condensation upon the vehicle's windows can result in poor visibility by an operator when the vehicle is subsequently operated, thereby causing an issue with respect to safety. This condensation can be difficult to remove, particularly when frozen, such as in a thin layer of frost.

Additionally, when a vehicle is parked out of doors in most any weather conditions damage to the vehicle may result. For example, the unimpeded rays of the sun may cause extreme temperatures to result inside of vehicle compartments, such as a passenger cockpit, a trunk, or the like. Moreover, such solar rays may deteriorate materials from which the vehicle is made, such as by breaking down the hydrocarbon chains of various plastics and rubbers and destroying paint coatings.

Damage to vehicles may result from physical assaults occurring in nature, both weather related and otherwise. For example, hail stones resulting from weather conditions causing precipitation to freeze into relatively large masses can cause damage to paint coatings as well as to other vehicle materials such as metal and glass. Matter dropped from overhanging trees, such as leaves, branches, and sap, can both stain vehicle surfaces and cause damage to various materials. Matter deposited upon the vehicle from animals, such as birds, can similarly result in stains and other damage.

Providing a covering over the vehicle's surfaces has been long known to provide at least some measure of protection to the vehicle for weather and other sources of damage. A highly effective covering may be provided in the form of a garage or other structure into which the vehicle may be driven. However, such structures are typically expensive and may not always be available. For example, persons owning vehicles may live in an apartment complex which does not provide parking shelters for their tenants' vehicles. Likewise, a vehicle may be parked out of doors when the operator thereof travels about, such as when going to work or shopping.

A sheet of material, such as cotton duck, may be placed over the windshield of a vehicle to prevent moist air from circulating across the surface overnight to avoid condensation from collecting on the window. However, such protective coverings tend to be difficult to attach to the vehicle and, therefore, are highly susceptible to being lost due to wind or theft.

Covers sized and shaped to cover the entire vehicle have also been used to provide a protective covering. For example, covers fitted for a particular vehicle, both custom fitted for a particular make and model as well as fitted for a category of vehicle, such as full sized sedan, have been used to provide protective coverings. These covers may employ some form of girth strap or cable, traversing underneath the vehicle from side to side, to discourage their removal from theft or wind. Such girth straps are difficult to install and remove. Alternatively, these covers may employ some form of weighting around the perimeter. Such perimeter weights are prone to damaging the vehicle when the cover is installed, removed, or when billowing in the wind. Moreover, such perimeter weights are wholly ineffective in preventing loss due to theft.

In addition to the aforementioned problems with attaching the various forms of covers to a vehicle, previous solutions have generally been difficult to install upon the vehicle. For example, an individual is often without assistance when installing a protective cover and will experience the frustration of placing one portion of the cover in a desired position on the vehicle frustration is compounded when attempting to install the cover with even a small amount of wind.

Accordingly, a need exists in the art for a protective cover which is adapted to be easily retained, such as to discourage loss due to wind or theft. Moreover, a need exists in the art for a protective cover which is easily installed, even by a single individual.

BRIEF SUMMARY OF THE INVENTION

The present invention is directed to systems and methods which provide a cover having a retaining piping disposed along an edge thereof. According to a preferred embodiment, retaining piping of a cover of the present invention is disposed such that a portion of the cover passes through an opening in a vehicle, or other object to be covered, and the retaining piping cannot pass through the opening, thereby preventing the removal of the cover from the vehicle.

Preferably, covers of the present invention are adapted to include retaining piping disposed for easy installation of the cover upon the vehicle. For example, retaining piping may be disposed to correspond with a vehicle trunk lid gap, to thereby facilitate an individual opening the trunk, inserting an edge of the cover having retaining piping along an end of trunk, and closing the trunk lid to securely retain the cover. Thereafter, the individual may fully deploy the cover knowing that at least the aforementioned edge will be held in place securely as remaining portions of the cover are moved into a desired position.

Moreover, irrespective of wind or attempts at removal by a would-be-thief, preferred embodiments of the present invention will not allow removal of the cover from the vehicle once the retaining piping is engaged, without damaging the cover. Of course, the cover may be easily removed, when desired, by again opening the gap into which the retaining piping is placed, such as by unlocking the vehicle's trunk and opening the trunk lid.

It should be appreciated that covers of the present invention are not limited to a single edge having the aforementioned retaining piping. Accordingly, embodiments of the present invention include a plurality of retaining pipings. For example, retaining piping of the present invention may be disposed along opposing edges of a cover to minimize the movement of the cover possible after its installation.

Accordingly, a technical advantage of the present invention is that vehicle covers are adapted to be easily retained when deployed. Moreover, a technical advantage of the present invention is that vehicle covers are easily installable.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1A:
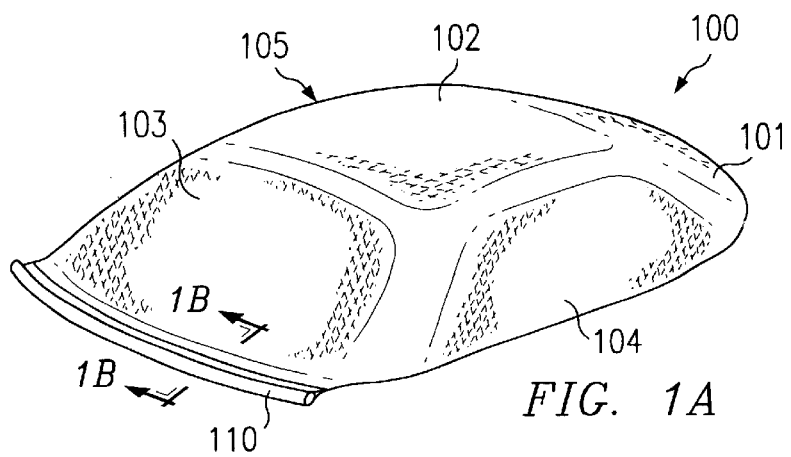
FIGS. 1A and 1C show a vehicle cover according to embodiments of the present invention.

Directing attention to FIG. 1A, a vehicle protective cover according to an embodiment of the present invention is shown as cover 100. Cover 100 of the illustrated embodiment is shaped to fit the passenger cockpit of a vehicle, such as a full sized sedan, providing protective covering of the windows and roof thereof. Accordingly, cover 100 shown in FIG. 1A includes front 101, top 102, back 103, right side 104, and left side 105. Cover 100 further includes retaining piping 110 of the present invention disposed longitudinally along an edge thereof. As will be explained in detail hereinbelow, retaining piping 110 is preferably adapted to cooperate with a portion of a vehicle upon which cover 100 is disposed to retain cover 100 in communication with the vehicle.

It should be appreciated that any number of other cover configurations may be utilized according to the present invention and, therefore, cover 100 is merely exemplary of an embodiment of the present invention. For example, a cover of the present invention may be configured to cover substantially only the widows of a vehicle and, therefore, top 102 may substantially replaced by an opening or void in the cover material. Such a configuration may be utilized to provide protection with respect to condensation of water, frost, solar rays, etcetera, while providing a cover which is light and requires little room for storage. Likewise, a cover of the present invention may be configured to cover more area of a vehicle, such as exposed paint coated surfaces, to thereby protect the surfaces from solar rays, deposit of plant or animal matter, etcetera. Moreover, a cover according to the present invention need not be fitted to conform to the shape of a vehicle. For example, a flat sheet of material sized and/or shaped to correspond to a surface or surfaces to be protected may be utilized according to the present invention.

Covers of the present invention may be made of a variety of materials. For example, cover 100 may be comprised of cotton duck, acrylic, polyester, nylon, and/or other sheet material. Moreover, covers of the present invention may be comprised of composite and/or laminated materials. For example, a laminated sheet having a first surface providing opacity for blocking solar rays, a second surface providing water resistance and water vapor permeability to prevent water infiltration while allowing the cover to "breathe", and a third surface providing quilting for protecting paint coated surfaces from scratches may be utilized according to the present invention. Additionally or alternatively, materials from which covers of the present invention are made may comprise a reflective surface, such as aluminized MYLAR, upon one side to reflect heat and/or a black body surface, such as woven textiles dyed black, to absorb heat. Such surfaces may be used according to season to, in the case of the reflective surface, keep a vehicle cool in the summer or, in the case of the black body surface, discourage the formation of ice. Moreover, a cover of the present invention may be reversible to provide advantages of both as desired. Examples of commercially available material which may be utilized in a cover of the present invention include SUNBRELLA™, available from Glen Raven Mills, Inc., Glen Raven N.C., TECFINALON™, available from Cover Craft Industries, Inc., Chatsworth, Calif., and NOAH™, available from Kimberly-Clark Corporation, Neenah, Wis.

Embodiments of the present invention may further adapt the material thereof to provide active functionality. For example, cover 100 or portions thereof may include heating elements to provide active heating of surfaces of a vehicle, by connecting a power cord attached thereto to a power source of the vehicle or a power source external thereto. Such heating elements may be useful in reducing or elimination the buildup of snow on the vehicle, prevent frost from forming on surfaces, and/or prevent mechanisms, such as door locks, from freezing. Additionally or alternatively, solar cells may be integrated into top 102, for example, to provide power to heating elements or other active components of cover 100 and/or to recharge a power source of the vehicle. Cover 100 may include active components providing enhanced security, such as continuity detectors, proximity detectors, etcetera, useful in providing active security with respect to cover 100 and/or a vehicle covered thereby.

Figure 1B:
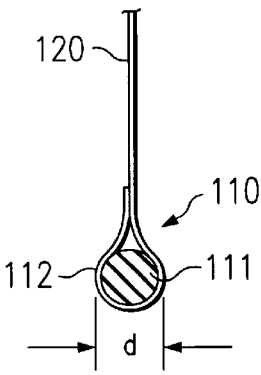
FIG. 1B shows detail with respect to a retaining piping of the vehicle cover of FIGS. 1A and 1C according to an embodiment of the present invention.

Retaining piping 110 is preferably sized and shaped to be firmly held in a gap formed in a surface of a covered vehicle while being easily installed and removed therefrom as desired. Directing attention to FIG. 1B, a cross section view of retaining piping 110 of the illustrated embodiment is shown to include core 111 incarcerated by envelope 112 disposed from end 120.

Envelope 112 and/or end 120 may be comprised of a same material as is the main portion of cover 100. For example, end 120 and envelope 112 may be an end of a sheet of material from which cover 100 is made such that envelope 112 is formed from such an end being turned back upon itself and fastened to end 120 (e.g., forming a hem).

Alternatively, envelope 112 and/or end 120 may be comprised of a material different than the main portion of cover 100 and/or different than each other. However, the materials from which envelope 112 and end 120 are made are preferably resilient, resistant to shear, and non-abrasive to facilitate their continued insertion into and out of a gap in a vehicle without causing damage to the vehicle or themselves.

Core 111 may be comprised of a number of materials suitable for disposing in a gap for retaining cover 100. However, core 111 of a preferred embodiment is flexible and resilient. For example, core 111 may be comprised of a length of braided or woven fibers, such as a nylon, polyester, or cotton rope or cord. Additionally or alternatively, core 111 may be comprised of a tube or other hollowed structure, such as may be formed of various rubbers or plastics. Similarly, core 111 may be comprised of a solid structure, such as a length of rubber, plastic, or neoprene, any or all of which may be foamed to provide increased resiliency and/or lessen the chance of causing damage to a vehicle. Core 111 of a preferred embodiment is substantially cylindrical, having a diameter in the range of from ¼ of an inch to ½ of an inch, and sufficiently resistant to compression to avoid its unwanted extraction from a gap.

Core 111 of a preferred embodiment runs substantially the full length of end 120 and/or a corresponding gap into which end 120 is disposed to provide a maximum resistance to removal of cover 100 from a vehicle. However, core 111 may be substantially of any size. For example, a number of shorter cores may be disposed throughout the length of envelope 112 with spacing between, if desired.

Preferably core 111 arid envelope 112 are selected to cooperate to provide retaining piping 110 with a cross section dimension (e.g., d of FIG. 1B) of sufficient size to be prevented from passing through a gap formed in a surface of a covered vehicle. A preferred embodiment of cover 100 is adapted to have retaining piping 110 disposed in a cavity of a vehicle such that end 120 passes through a gap in the exterior of the vehicle while retaining piping 110 is sized and shaped to resist removal through the gap. Accordingly, cover 100 may be deployed to cover the vehicle, or a portion thereof, and securely attached thereto.

Although a preferred embodiment is illustrated having core 111 disposed within envelope 112, it should be appreciated that core 111 is optional with respect to embodiments of the present invention. For example, material of end 120 may be rolled back upon itself, or otherwise gathered in sufficient bulk, to provide retaining piping 110 without including core 111 therein. Similarly, envelope 112 is optional in that core 111 of particular embodiments may be affixed directly to end 120.

Figure 2A:
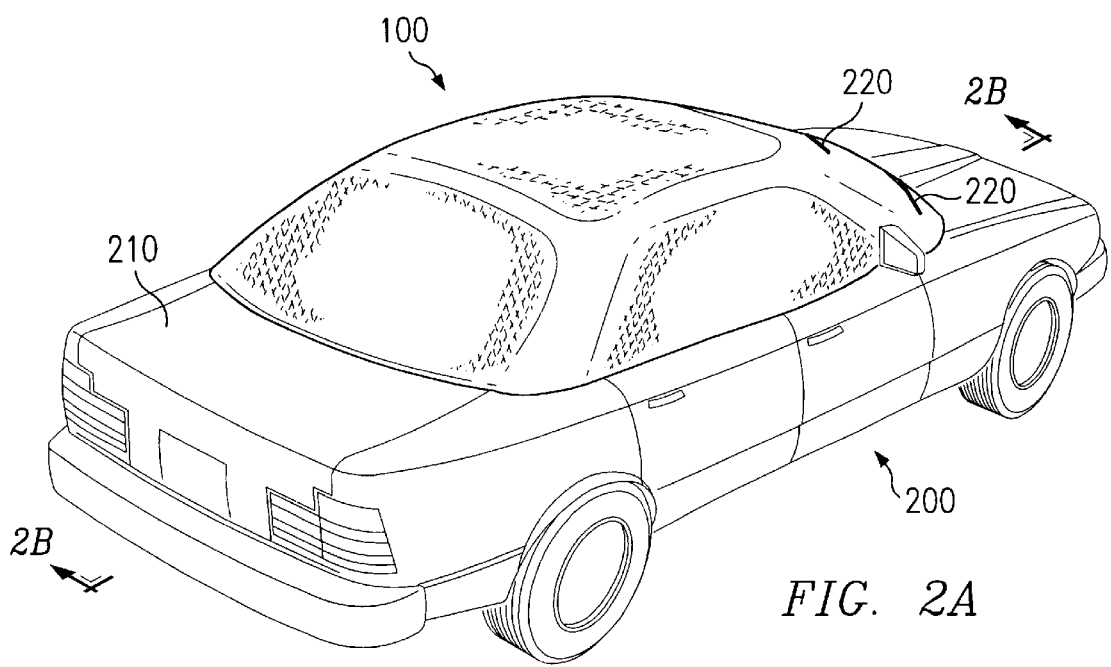
FIGS. 2A and 2B show the vehicle cover of FIG. 1A deployed with respect to a vehicle according to an embodiment of the present invention.
Figure 2B:
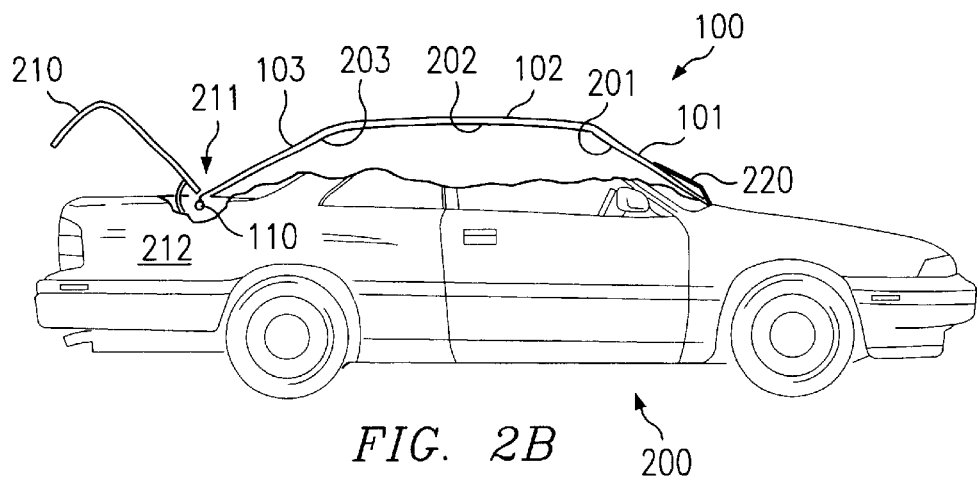
Figure 2C:
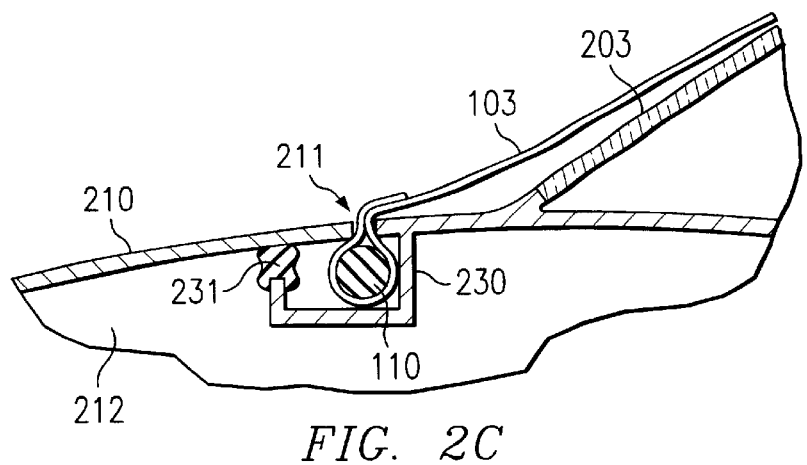
FIG. 2C shows detail with respect to engaging of a retaining piping in a cavity of a vehicle according to an embodiment of the present invention.

Referring to FIGS. 2A–2C, deployment of cover 100 according to a preferred embodiment is illustrated. Retaining piping 110 of the illustrated embodiment is disposed in trunk cavity 212 of vehicle 200 while end 120 is passed through gap 211 in the exterior of vehicle 200. To facilitate passing of end 120 through gap 211 while retaining piping 110 is disposed in trunk cavity 212, gap 211 is preferably selected to be capable of adjustment. For example, trunk lid 210, defining an edge of gap 211, is movable between an opened position (shown in FIG. 2B) and a closed position (shown in FIG. 2A). When trunk lid 210 is in the opened position, gap 211 is enlarged to a point to allow substantially unimpeded passage of retaining piping 110 therethrough. However, when trunk lid 210 is in the closed position, gap 211 is reduced to a point to prevent passage of retaining piping 110 therethrough, although end 120 of the preferred embodiment extends through gap 211 with substantially no binding.

It should be appreciated that the above described configuration, having retaining piping 110 disposed in a cavity of the vehicle and end 120 passing through a gap in the exterior of the vehicle, may result in the infiltration of the cavity with external elements, such as water, air, and/or air borne particles. For example, the material of end 120 may wick rain water from the exterior environment into trunk cavity 212 in some situations. Accordingly, preferred embodiments of the present invention are adapted so as not to interfere with seals or weather-stripping of a host vehicle.

Directing attention to FIG. 2C, detail with respect to a typical configuration of a trunk seal. Specifically, "J" channel 230 is disposed below the deck of vehicle 200 in juxtaposition with gap 211. Weather-stripping 231 is disposed upon an end of J channel 230 such that when trunk lid 210 is in the closed position, weather-stripping 231 is compressed to seal trunk cavity 212 from the exterior elements. J channel 230 provides a sub-cavity of trunk cavity 212 in which retaining piping 110 of the present invention may be disposed without compromising the seal between the main cavity of trunk cavity 212 and the exterior of vehicle 200. It should be appreciated that a variety of gaps in a typical vehicle, such as those surrounding doors, hatches, etcetera, provide similarly sealed cavities usable according to the present invention.

When retaining piping 110 of the preferred embodiment is disposed in trunk cavity 212, the main body of cover 100, including front 101, top 102, back 103, right side 104, and left side 105, may be disposed in juxtaposition with corresponding surfaces of vehicle 200. For example, in the illustrated embodiment front 101 is disposed to cover windshield 201, top 102 is disposed to cover roof 202, and back 103 is disposed to cover rear window 203.

It should be appreciated that, once retaining piping 110 is disposed in trunk cavity 212 and trunk lid 210 closed, and therefore locked, cover 100 becomes affixed to vehicle 200 in such a way as to prevent its loss due to wind. Likewise, retaining piping 110 being held within trunk cavity 212 by locked trunk lid 210 discourages removal by theft as appreciable time and/or substantial damage to cover 100 is required for its removal.

Moreover, retaining piping 110 being held within trunk cavity 212 facilitates the easy installation of cover 100. Specifically, one end of cover 100 will be firmly held, allowing an individual to pull distal end of cover 100 over vehicle 200. Accordingly, a single individual may easily deploy cover 100 to cover vehicle 200.

It should be appreciated that the embodiment of FIGS. 2A–2C provides a convenient arrangement for covering and uncovering vehicle 200. Specifically, cover 100 may be stored in trunk cavity 212 when not in use. When needed, trunk lid 210 may be opened to both provide access to cover 100 as well as to enlarge gap 211. Cover 100 may be drawn from trunk cavity 212 via gap 211 to a point retaining piping 110 is in proper position for closing trunk lid 210 and incarcerating retaining piping 110. Cover 100 may then be fully deployed over vehicle 200.

Although retaining piping 110 of the illustrated embodiment will prevent the separation of cover 100 from vehicle 200 until gap 211 is expanded and retaining piping 110 passed therethrough, the remainder of cover 100 is substantially free to be positioned/repositioned upon vehicle 200. To retain cover 100's protective/covering functionality, such as during windy conditions, it may be desirable to provide attachment of cover 100 to vehicle 200 at positions other than end 120 and/or to adapt cover 100 to resist undesired movement. Fitting cover 100 to the shape of vehicle 200, or aspects thereof, may be utilized to discourage undesired movement. For example, the illustrated embodiment of cover 100 is shaped to substantially fit the contours of the passenger cockpit of vehicle 200 and, therefore, is less likely to experience undesired movement than is an unshaped cover configuration. Fitting may be accomplished by darts and pleats formed into the cover. Covers of the present invention may be further shaped, such as to include mirror pockets, and incarcerate various aspects of a vehicle to prevent undesired movement and/or provide improved protection/covering. Additionally or alternatively, covers of the present invention may be adapted to attach to a vehicle at multiple points, such as by providing retaining piping along multiple edges thereof, having straps attached thereto, including grommets or other orifices for attachment, etcetera. However, the illustrated embodiment utilizes movable portions of vehicle 200, here windshield wipers 220, to anchor the end distal from end 120 to vehicle 200.

Figure 1C:
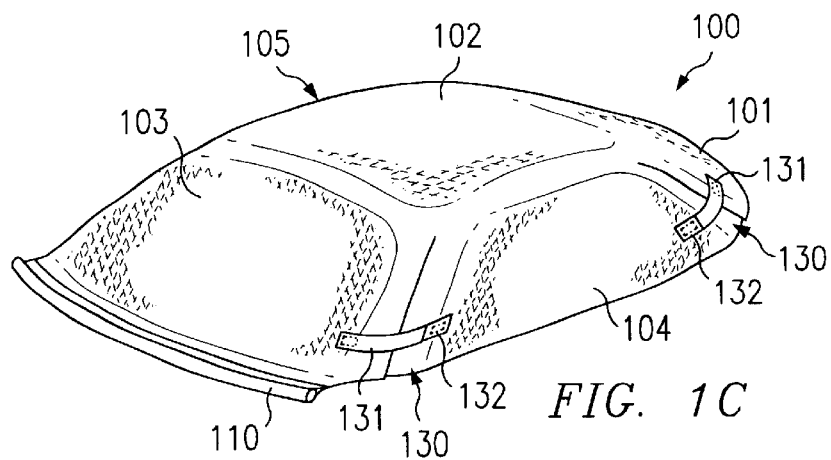

Embodiments of cover 100 may be adapted to provide an adjustable fit, such as to facilitate installation of the cover over irregular objects and/or to provide a cover adapted to fit a variety of vehicles. For example, cover 100 may utilize adjustable interconnection of portions of the cover, such as using adjustable fasteners 130 of FIG. 1C. Adjustable fasteners 130 preferably provide for adjustment of the interfacing of various faces of cover 100. Adjustable fasteners 130, shown here providing adjustable interfacing of front 101, back 103, and right side 104, may be hook and loop fasteners comprising hook strap portion 131 and loop receiver portion 132. However, adjustable fasteners 130 may be comprised of any number of now known or later to be developed fastening means, including strap and buckle, elastic shock cord, lacing, tie line, snap, button, zipper, and/or the like. Adjustable fasteners 130 may be disposed at various positions upon cover 100, as desired. In the illustrated embodiment, adjustable fasteners 130 are disposed to correspond to the vehicle's "A" and "C" pillars in order to provide a cover which is semi-custom fit for a vehicle category, e.g., full size sedans.

It should be appreciated that adjustable fasteners 130 may cooperate in a number of ways with the material of cover 100 to provide a desired fit. For example, front 101, back 103, and right side 104 of cover 100 shown in FIG. 1C may each be an independent "leaf" being attached to top 102 while having a gap between each other, i.e., a gap in the cover material between front 101 and right side 104 and a gap in the cover material between back 103 and right side 104. Accordingly, these leaves may be substantially independently placed into position and adjustable fasteners 130 employed to hold their position with respect to other ones of the leaves. For example, a portion of front 101 and back 103 may over lap a portion of right side 104 when adjustable fasteners 130 are engaged to provide a fully protective covering of the passenger cab of vehicle 200 and/or provide connection with respect to the aforementioned continuity detectors of an active security system. Additionally or alternatively, gathers or folds of cover material may be formed between various portions of cover 100 as adjustable fasteners 130 are engaged.

Although the embodiment of a cover according to the present invention described in detail above is shown with retaining piping 110 disposed upon a distal end thereof, it should be appreciated that there is no such limitation according to the present invention. For example, an end having retaining piping of the present invention thereon may be disposed at any position on a cover to correspond with a gap utilized to retain the cover.

Figure 3:
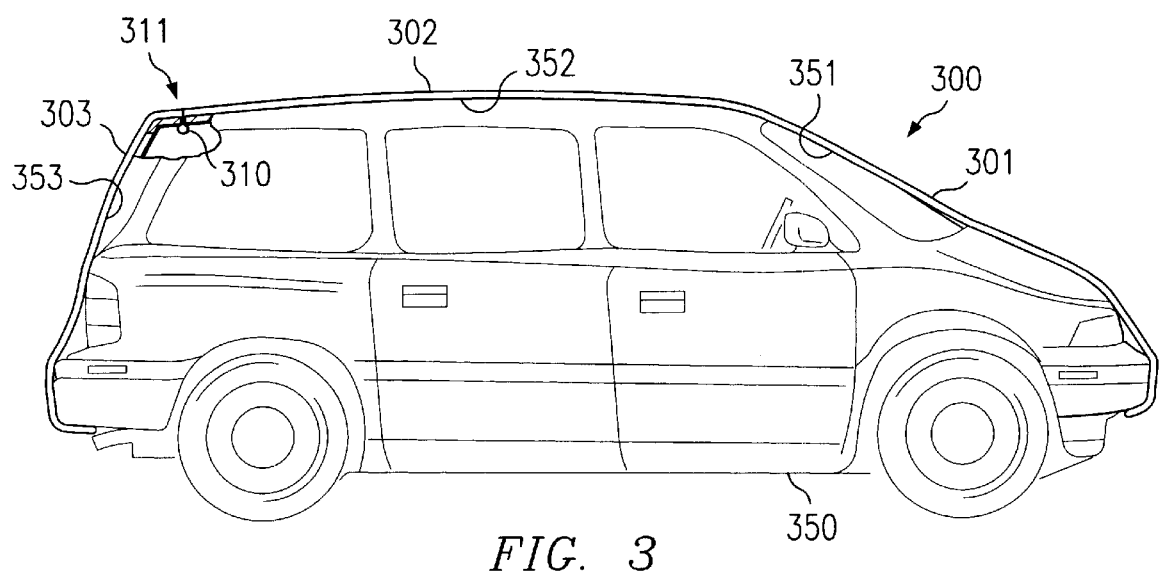
FIG. 3 shows an alternative embodiment vehicle cover of the present invention.

Directing attention to FIG. 3, an alternative embodiment wherein end 311 and retaining piping 310 are disposed at a position other than a distal end (referred to herein as disposed at an intermediate position) of cover 300 of the present invention is shown. In the embodiment of FIG. 3, cover 300 may provide substantially full coverage of vehicle 350. Accordingly, in deploying the cover, cover 300 may be placed upon roof 352 of vehicle 350 with back 303 of cover 303 folded back to expose end 311 and retaining piping 310. Hatch 353 of vehicle 350 may be opened such that a gap between hatch 353 and roof 352 is enlarged and retaining piping 310 passed therethrough. Thereafter, hatch 353 may be closed, and preferably locked, to trap retaining piping 310 while end 311 extends through the gap and, thereby, tethers cover 300 to vehicle 350. Accordingly, cover 300 may be deployed over vehicle 350, such as to dispose front 301 over windshield 351, top 302 over roof 352, and back 303 over hatch 353, without fear of cover 300 being removed, such as by wind or theft.

It should be appreciated that although the embodiment of FIG. 3 is illustrated with reference to a vehicle having a hatch, a similar configuration may be utilized in providing a full covering for vehicle 200 of FIG. 2 by providing end 120 and retaining piping 110 at an intermediate position corresponding with the above described trunk lid gap. Moreover, additional or alternative vehicle gaps may be utilized with respect to such ends and retaining piping disposed at intermediate or other positions, if desired. For example, an end and retaining piping disposed at an intermediate position corresponding to a door gap of a vehicle to be covered may be utilized in addition to or in alternative to end 120 and retaining piping 110 of FIG. 2 or end 311 and retaining piping 310 of FIG. 3. Accordingly, a cover of the present invention may be placed upon a vehicle's roof, a door opened, the retaining piping disposed at an intermediate position passed through the door gap, and the door closed. One or more such door gaps may be utilized, such as door gaps on opposing sides of the vehicle, to provide attachment of the cover to the vehicle.

Embodiments of the present invention may be utilized to provide a protective/covering functionality to items in addition to or in alternative to the aforementioned vehicles. For example, a cover of the present invention may be utilized to provide a protective covering with respect to items disposed on or in a vehicle, such as upon an exterior cargo rack or disposed in a bed of a truck. According to one embodiment of the invention, a cover is sized and shaped to fit a service van having a ladder rack disposed upon the roof thereof. According to this embodiment, an end having restraining piping may be disposed in a gap at the rear of the vehicle, such as retaining piping 310 of FIG. 3, and the cover deployed over both the vehicle and the equipment (e.g., ladders, tools, toolboxes, service parts, etcetera) disposed upon the aforementioned ladder rack. To provide additional protection, it may be desirable to include additional ends having retaining piping on the cover, such as to correspond with the driver and passenger door of the aforementioned van, in order to further prevent access to the equipment disposed upon the ladder rack. Such an embodiment, although perhaps not preventing a tenacious thief, serves to hide equipment from view as well as discourage its theft as appreciable time would be involved in both identifying the equipment as well as removing the equipment from the protection of the cover.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A vehicle cover comprising:
   a cover body to cover at least a portion of a vehicle;
   an end extending from said cover body; and
   a retaining piping disposed longitudinally along said end, said retaining piping providing a cross-sectional dimension to prevent extraction of said retaining piping from a gap in a surface of said vehicle, wherein said retaining piping is adapted to occupy a cavity of said vehicle having a weather seal without compromising said weather seal.

2. The cover of claim 1, wherein said cover body is sized and shaped to fit at least a portion of said vehicle.

3. The cover of claim 2, wherein said cover body is sized and shaped to substantially fully cover said vehicle.

4. The cover of claim 2, wherein said cover body is sized and shaped to cover substantially only a passenger cockpit of said vehicle.

5. The cover of claim 2, wherein said cover body includes adjustable fastening means for providing a desired final size and shape.

6. The cover of claim 1, wherein said cover body is comprised of sheet duck material.

7. The cover of claim 1, wherein said cover body is comprised of composite materials.

8. The cover of claim 1, wherein said cover body is comprised of laminated materials.

9. The cover of claim 1, wherein said cover body is adapted to reflect solar energy.

10. The cover of claim 1, wherein said cover body is adapted to collect solar energy.

11. The cover of claim 1, wherein said cover body is adapted to provide active functionality.

12. The cover of claim 11, wherein said cover body comprises heating elements to provide active heating functionality.

13. The cover of claim 11, wherein said cover body comprises solar cells to provide active energy collection.

14. The cover of claim 11, wherein said cover body comprises continuity detectors to provide active security.

15. The cover of claim 1, wherein said end is disposed along a distal end of said cover body.

16. The cover of claim 15, wherein said distal end of said cover body corresponds to a trunk of said vehicle.

17. The cover of claim 15, wherein said distal end of said cover body corresponds to a door of said vehicle.

18. The cover of claim 1, wherein said end is disposed at an intermediate location of said cover body.

19. The cover of claim 18, wherein said intermediate location of said cover body corresponds to a trunk of said vehicle.

20. The cover of claim 18, wherein said intermediate location of said cover body corresponds to a hatch of said vehicle.

21. The cover of claim 18, wherein said intermediate location of said cover body corresponds to a door of said vehicle.

22. The cover of claim 1, wherein said retaining piping comprises an envelope.

23. The cover of claim 22, wherein said envelope incarcerates a core, said envelope and said core cooperating to provide said cross-sectional dimension.

24. The cover of claim 1, wherein said retaining piping comprises a core material.

25. The cover of claim 24, wherein said core material comprises woven fibrous matter.

26. The cover of claim 25, wherein said core material comprises a cord.

27. The cover of claim 24, wherein said core material comprises resilient matter.

28. The cover of claim 27, wherein said resilient matter comprises a rubber.

29. The cover of claim 27, wherein said resilient matter is foamed.

30. The cover of claim 27, wherein said resilient matter is tubular.

31. A system for providing protective covering of an object, said system comprising:
    a cover body for providing said protective covering; and
    a retaining piping for disposing in a cavity of said object to thereby attach said cover body to said object, wherein said cavity has a seal associated therewith and said retaining piping is sized to occupy said cavity without compromising said seal.

32. The system of claim 31, wherein said object comprises a vehicle.

33. The system of claim 31, wherein said object comprises equipment disposed externally upon a vehicle.

34. The system of claim 32, wherein said cavity comprises a channel along an edge of a closeable orifice.

35. The system of claim 34, wherein said closeable orifice comprises a trunk opening.

36. The system of claim 34, wherein said closeable orifice comprises a hatch opening.

37. The system of claim 34, wherein said closeable orifice comprises a door opening.

38. The system of claim 34, wherein said channel comprises compressible weather-striping, wherein a seal provided by said compressible weather-striping is unaffected by disposing said retaining piping in said cavity for attaching said cover body to said vehicle.

39. The system of claim 31, wherein said retaining piping is disposed at a distal end of said cover body.

40. The system of claim 31, wherein said retaining piping is disposed at an intermediate location of said cover body.

41. A method for providing protective covering of a vehicle, said method comprising:
    opening a gap in the exterior of said vehicle;
    placing a retaining piping coupled to a vehicle cover in a cavity in communication with said gap;
    extending a portion of a said vehicle cover through said gap;
    closing said gap to incarcerate said retaining piping in said cavity, wherein said closing said gap to incarcerate said retaining piping does not compromise a weather seal of said cavity; and deploying said vehicle cover to cover a desired portion of said vehicle.

42. The method of claim 41, wherein said gap comprises a trunk lid edge gap.

43. The method of claim 41, wherein said gap comprises a door edge gap.

44. The method of claim 41, wherein said gap comprises a hatch edge gap.

45. The method of claim 41, further comprising:

opening a second gap in the exterior of said vehicle;

placing a second retaining piping coupled to said vehicle cover in a second cavity in communication with said second gap;

extending a portion of said vehicle cover through said second gap; and closing said second gap to incarcerate said second retaining piping in said second cavity.

46. The method of claim 41, wherein said deploying said vehicle cover to cover a desired portion of said vehicle also covers equipment disposed external to said vehicle.

47. A vehicle cover comprising:

a cover body to cover at least a portion of a vehicle, wherein said cover body comprises solar cells to provide active energy collection;

an end extending from said cover body; and a retaining piping disposed longitudinally along said end, said retaining piping providing a cross-sectional dimension to prevent extraction of said retaining piping from a gap in a surface of said vehicle.

48. A vehicle cover comprising:

a cover body to cover at least a portion of a vehicle;

an end extending from said cover body, wherein said end is disposed at an intermediate location of said cover body, wherein said intermediate location of said cover body corresponds to a hatch of said vehicle; and a retaining piping disposed longitudinally along said end, said retaining piping providing a cross-sectional dimension to prevent extraction of said retaining piping from a gap in a surface of said vehicle.

49. A vehicle cover comprising:

a cover body to cover at least a portion of a vehicle, wherein said cover body is sized and shaped to fit at least a portion of said vehicle, wherein said cover body is sized and shaped to cover substantially only a passenger cockpit of said vehicle;

an end extending from said cover body; and a retaining piping disposed longitudinally along said end, said retaining piping providing a cross-sectional dimension to prevent extraction of said retaining piping from a gap in a surface of said vehicle, wherein said retaining piping is adapted to occupy a cavity of said vehicle without compromising a weather seal thereof.

50. A vehicle cover comprising:

a cover body to cover at least a portion of a vehicle;

an end extending from said cover body, wherein said end is disposed at an intermediate location of said cover body; and a retaining piping disposed longitudinally along said end, said retaining piping providing a cross-sectional dimension to prevent extraction of said retaining piping from a gap in a surface of said vehicle, wherein said retaining piping is adapted to occupy a cavity of said vehicle without compromising a weather seal thereof.

51. The cover of claim 50, wherein said intermediate location of said cover body corresponds to a trunk of said vehicle.

52. The cover of claim 50, wherein said intermediate location of said cover body corresponds to a hatch of said vehicle.

53. The cover of claim 50, wherein said intermediate location of said cover body corresponds to a door of said vehicle.

54. A system for providing protective covering of an object, said system comprising:

a cover body for providing said protective covering; and a retaining piping for disposing in a cavity of said object to thereby attach said cover body to said object, wherein said cavity comprises a channel along an edge of a closeable orifice, wherein said retaining piping is sized to occupy said cavity without compromising a seal thereof, wherein said closeable orifice comprises a trunk opening.

55. A system for providing protective covering of an object, said system comprising:

a cover body for providing said protective covering; and a retaining piping for disposing in a cavity of said object to thereby attach said cover body to said object, wherein said cavity comprises a channel along an edge of a closeable orifice, wherein said retaining piping is sized to occupy said cavity without compromising a seal thereof, wherein said closeable orifice comprises a hatch opening.

56. A system for providing protective covering of an object, said system comprising:

a cover body for providing said protective covering; and a retaining piping for disposing in a cavity of said object to thereby attach said cover body to said object, wherein said cavity comprises a channel along an edge of a closeable orifice, wherein said retaining piping is sized to occupy said cavity without compromising a seal thereof, wherein said closeable orifice comprises a door opening.

* * * * *